United States Patent
Chapman et al.

(10) Patent No.: US 7,077,773 B2
(45) Date of Patent: Jul. 18, 2006

(54) DRIVE ASSEMBLY WITH DYNAMIC TENSIONING DEVICE

(75) Inventors: David J. Chapman, Sterling Heights, MI (US); John R. Rice, Chesterfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 205 days.

(21) Appl. No.: 10/420,372

(22) Filed: Apr. 21, 2003

(65) Prior Publication Data

US 2004/0209720 A1    Oct. 21, 2004

(51) Int. Cl.
*F16H 7/10* (2006.01)
(52) U.S. Cl. .......................... 474/112; 49/360
(58) Field of Classification Search .............. 474/112, 474/109, 101, 148; 296/155; 49/138, 216, 49/360
See application file for complete search history.

(56) References Cited

U.S. PATENT DOCUMENTS

| | | | | |
|---|---|---|---|---|
| 2,690,084 A | * | 9/1954 | Van Dam | 474/58 |
| 3,768,324 A | * | 10/1973 | Vanderstegen-Drake | 474/115 |
| 4,094,205 A | * | 6/1978 | Cook | 74/731.1 |
| 5,319,880 A | | 6/1994 | Kuhlman | |
| 5,396,158 A | | 3/1995 | Long et al. | |
| 5,785,620 A | * | 7/1998 | Beutel et al. | 474/132 |
| 6,004,112 A | * | 12/1999 | Cook et al. | 417/362 |
| 6,058,845 A | * | 5/2000 | Kelm | 101/494 |
| 6,108,975 A | * | 8/2000 | Bailey | 49/334 |
| 6,378,392 B1 | | 4/2002 | Dombrowski et al. | |
| 6,390,535 B1 | | 5/2002 | Chapman | |
| 6,464,287 B1 | | 10/2002 | Rogers, Jr. et al. | |
| 6,481,783 B1 | | 11/2002 | Rogers, Jr. et al. | |
| 6,561,569 B1 | | 5/2003 | Risdon et al. | |

* cited by examiner

*Primary Examiner*—Vicky A. Johnson
(74) *Attorney, Agent, or Firm*—Scott A. McBain

(57) ABSTRACT

A drive assembly for a closed loop cable system in which a flexible driver member drives a door or the like back and forth has the flexible drive member wrapped around and driven by a drive pulley. The drive assembly includes a motor unit having a motor shaft that rotates about a drive axis for rotating the drive pulley about a pulley axis, and a tensioning mechanism for adjusting the position of the pulley axis with respect to the drive axis responsive to tension in the flexible drive member.

18 Claims, 4 Drawing Sheets

DRIVE ASSEMBLY WITH DYNAMIC TENSIONING DEVICE

TECHNICAL FIELD

This invention relates generally to a closed loop system, such as a sliding door closure system for opening and closing a sliding door on a vehicle, and more particularly to a drive assembly for driving a flexible drive member, such as a cable, in any closed loop system.

BACKGROUND OF THE INVENTION

Van type vehicles for passengers and for cargo are frequently equipped with sliding side doors. Many vans include a single sliding door on the passenger side of the van. However, the van may be equipped with sliding doors on both sides. Drivers and passengers can open or close sliding doors of this type manually from inside or outside of the vehicle. However, the sliding door is usually heavy and often inconvenient and/or difficult to move manually, particularly from inside the vehicle.

For convenience, power operated sliding door closure systems have been developed to allow drivers and passengers to open and close a sliding door virtually effortlessly. Moreover the sliding door usually can be opened or closed from the driver's seat and/or one or more other locations remote from the sliding door.

One type of power operated sliding door closure system, known as a "closed loop" system, is disclosed in U.S. Pat. No. 6,390,535 which issued May 21, 2002 to David Joseph Chapman. The Chapman '535 patent discloses a power operated sliding door closure system in which a sliding door is mounted on a van by travelers that are slidably supported in upper, center and lower tracks. An opening and closing module is mounted inside the van adjacent the center track. A front cable is attached to one end of a cable drive spool and extends from the spool to the traveler via a fixed idler roll. A rear cable is attached to an opposite end of the cable drive spool and extends from the spool to the traveler via another fixed idler roll. A motor drive unit rotates the cable drive spool in one direction to open the sliding door and in an opposite direction to close the sliding door. The closed loop cable closure system disclosed in the Chapman '535 patent also includes two spring biased rollers that are mounted on the vehicle frame between the cable drive spool and the two idler rolls. The spring biased rollers engage the front and rear cables to provide a generally constant tension in the cables.

While the "closed loop" type of system disclosed in the Chapman '535 patent is satisfactory for its intended purpose, the system requires considerable space for the idler rolls and the spring biased rollers. Moreover, one or more of the spring biased rollers may produce reverse bending in the cable which increases fatigue and reduces durability.

Another type of closed loop system is disclosed in the U.S. Pat. No. 6,464,287 granted to Lloyd Walker Rogers, et al. Oct. 15, 2002. The Rogers '287 system includes a guide pulley at one end of a loop of beaded cable and a drive pulley at the opposite end of the loop that drives the beaded cable. The specification of the Rogers '287 patent states that additional guide pulleys can be used. However, a spring biased guide pulley to take up slack in the beaded cable is not shown or describe specifically.

SUMMARY OF THE INVENTION

According to the invention, a drive assembly for a closed loop system which not only drives the cable but also takes up the slack in the cable or cables to maintain cable tension thus eliminating, or at least reducing the number of spring biased idler pulleys or rollers in the closed loop system.

The drive assembly includes an electric motor that can be mounted on a fixed support, a drive pulley driven by the electric motor and an intervening tensioning mechanism that moves the drive pulley automatically with respect to the fixed motor to take up slack and provide tension in the cable or cables of a closed loop system.

The drive assembly may be adapted to any closed loop system that uses any type of flexible drive member, including a drive belt, a chain, a plain cable or a beaded cable.

The drive assembly preferably provides a tension in the cable that is equally balanced so that the drive assembly can be used in a closed loop system that also has spring biased idler roller to take up slack in the cable or cables.

BRIEF DESCRIPTION OF THE DRAWINGS

These and other features and advantages of the invention will become apparent to those skilled in the art in connection with the following detailed description and drawings, in which.

DETAILED DESCRIPTION OF THE PREFERRED EMBODIMENT

Figure 1:
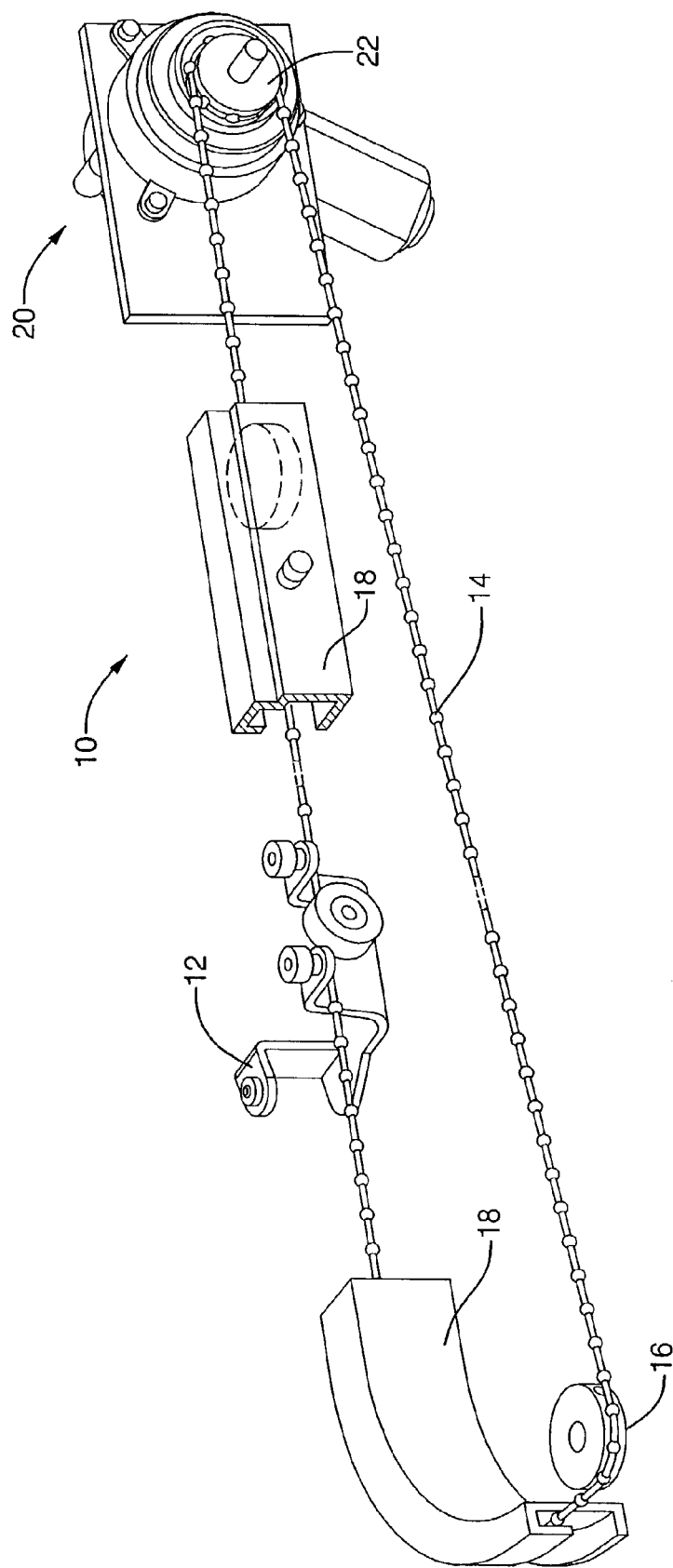
FIG. 1 is a schematic perspective view of a sliding door closure apparatus having a drive assembly in accordance with the invention.

A power operated, sliding door closure system for opening and closing a sliding door on a vehicle is generally shown at 10 in schematic FIG. 1. In FIG. 1 the system 10 is shown configured to be installed with a door closure apparatus in a van that includes a sliding door (not shown) supported on a plurality of sliding door tracks mounted on a vehicle frame. System 10 includes a traveler, shown at 12 in FIG. 1, that connects the closure system 10 to the sliding door. The door closure system moves the sliding door and traveler 12 along one of the sliding door tracks 18 between a closed position and an open position by means of a closed loop cable 14. Cable 14 which is illustrated as a beaded cable is attached to traveler 12 and loops around an idler pulley 16 and a drive pulley 22 of a drive assembly of the invention that is shown schematically at 20 in FIG. 1.

The drive assembly 20 constructed according to the invention and configured for use in a closed loop cable closure system 10 briefly described above is shown in more detail in FIGS. 2 and 3.

Figure 2:
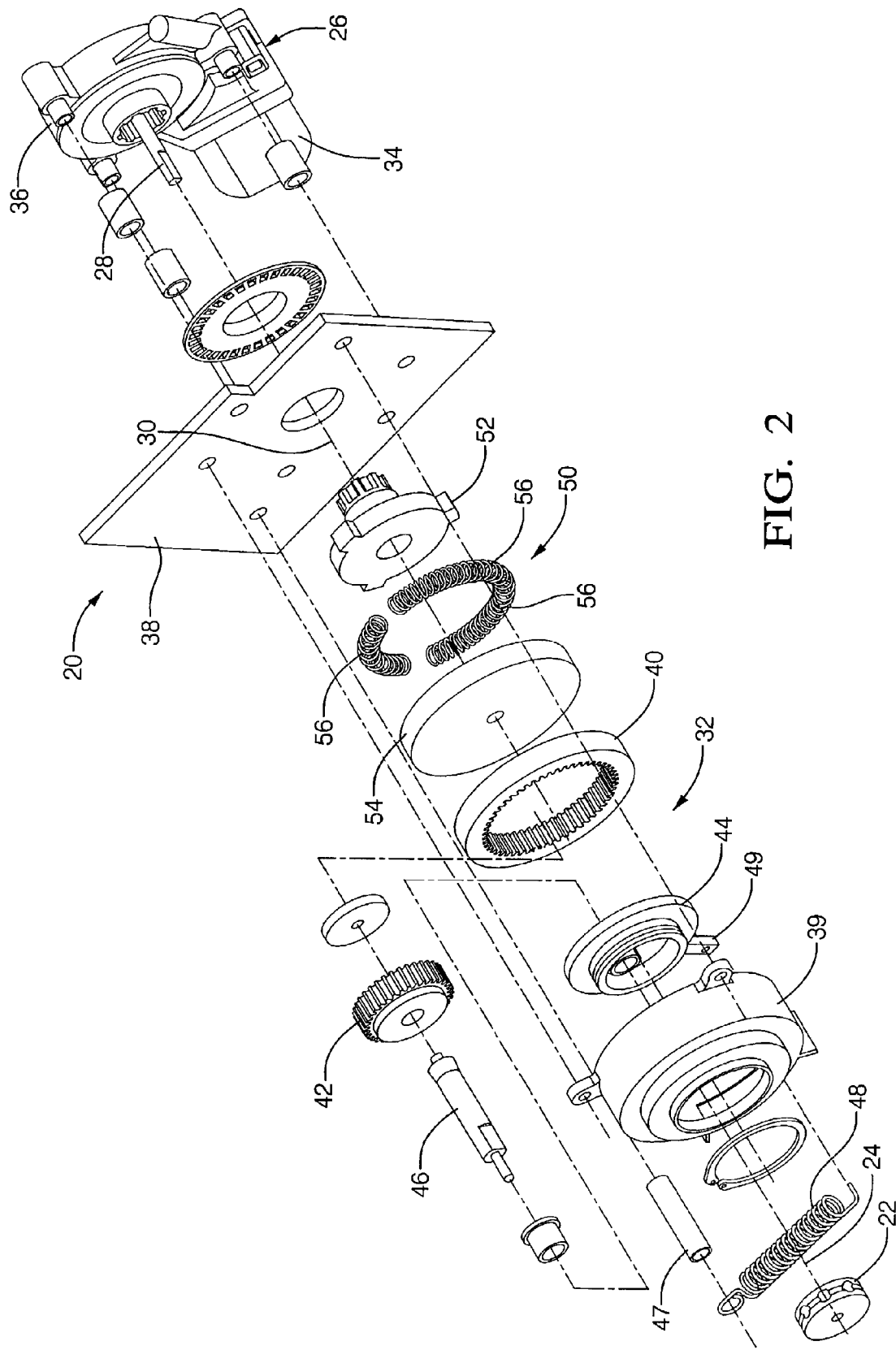
FIG. 2 is an exploded perspective view of the drive assembly that is shown in FIG. 1.
Figure 3:
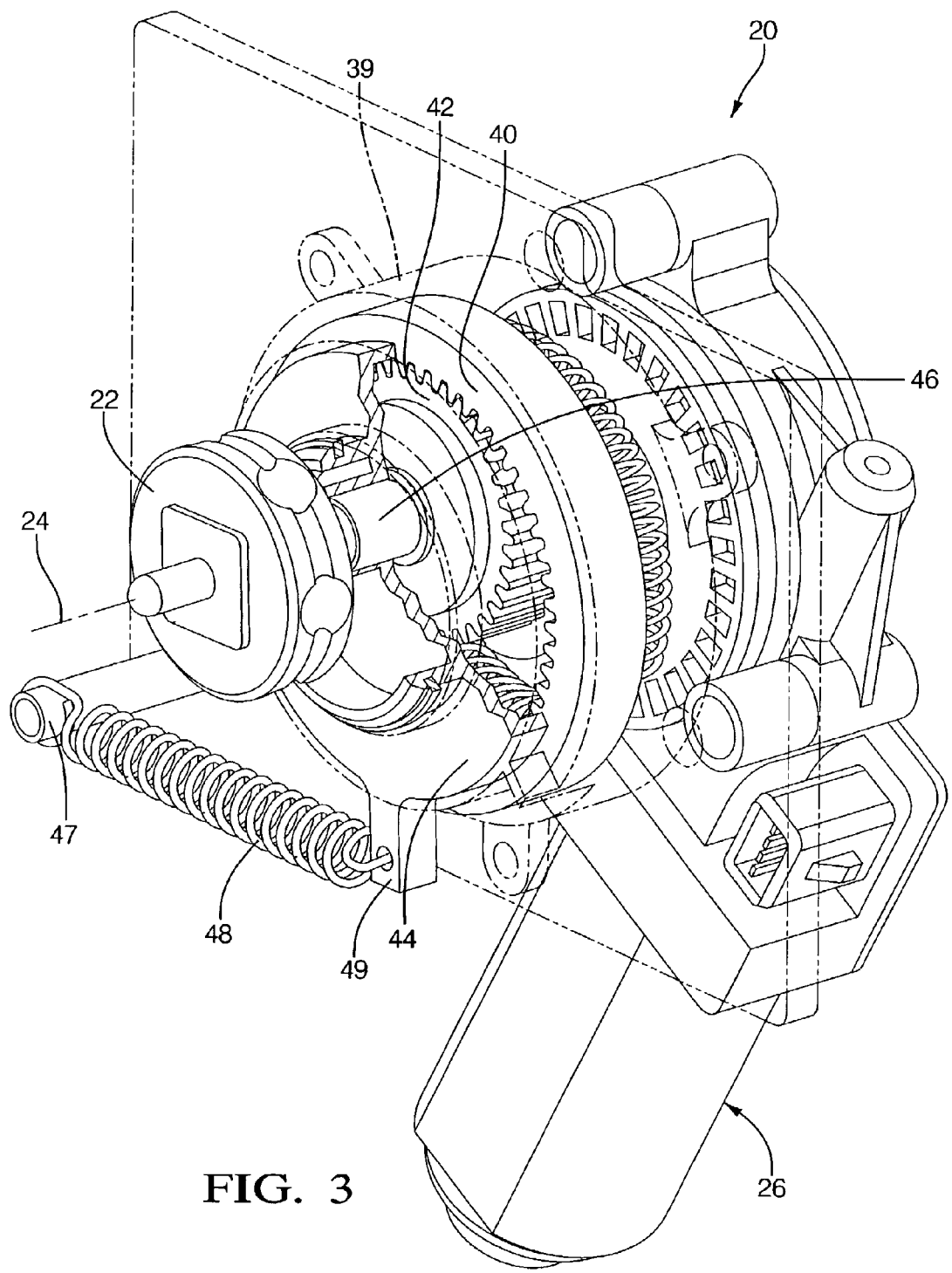
FIG. 3 is a perspective view of the drive assembly that is shown in FIGS. 1 and 2.

Referring now to FIGS. 2 and 3, drive assembly 20 comprises a drive pulley 22 that rotates about a pulley axis 24 to drive cable 14, a motor sub-assembly 26 having an motor shaft 28 that rotates about a drive axis 30 to rotate drive pulley 22, and an intervening, tensioning mechanism 32 that automatically adjusts the position of the pulley axis 24 with respect to the drive axis 30 to take up slack in cable 14.

Motor sub-assembly 26, which generally includes an electric motor 34 and a speed reducing gear set 36, and tensioning mechanism 32 are both fixedly mounted to a bracket 38 for attachment to vehicle structure (not shown).

Tensioning mechanism 32 comprises a housing 39 for a ring gear 40, a planet gear 42 that meshes with the ring gear 40 and a planet carrier 44 that supports the planet gear 42 rotationally. Preferably, ring gear 40 is an internal ring gear and planet gear 42 is inside ring gear 40 to conserve space.

Ring gear 40 is rotated about drive axis 30 by motor shaft 28 via an optional torsional damper 50. Torsional damper 50 comprises an input member 52 that is driven by motor shaft 28 and that in turn drives an output member 54 via a plurality of coil springs 56. Ring gear 40 is fixed to output member 54 in any suitable manner so that the ring gear is driven by the output member of the torsional damper 50. Torsional damper 50 is conventional and operates in a well known manner to smooth out any variation in torque applied to ring gear 40.

Planet carrier 44 is mounted in housing 39 for rotation about drive axis 30. Planet gear 42 is rotationally supported by planet carrier 44 off center so that planet gear 42 has an axis that travels in a circular orbit about drive axis 30 when planet carrier 44 is rotated.

Planet gear 42 is connected to drive pulley 22 by planet shaft 46 and thus moveable pulley axis 24 also travels in the same circular orbit about drive axis 30 as the axis of the planet gear 42 when planet carrier 44 is rotated. Tensioning mechanism 32 also includes a tension spring 48 that rotates planet carrier 44 about drive axis 30 incrementally to locate pulley axis 24 in the circular orbit and thus adjust the location of the pulley axis 24 with respect to drive axis 30 so as to take up slack in cable 14. More particularly, tension spring 48 is connected to a radial arm 49 of planet carrier 44 at one end and to a fixed anchor 47 on bracket 38 at the opposite end. Tension spring 48 produces a clockwise moment force on carrier 44 that tends to move pulley axis 24 toward the right as viewed in FIG. 1. This movement is resisted by cable 14 that is wrapped around the right side of pulley 22. Hence, the location of the pulley axis 24 is automatically adjusted when the tension in cable 14 produces a counterclockwise moment force on carrier 44 that cancels the clockwise moment force produced by tension spring 48.

Planet gear 42 preferably has a similar pitch diameter as the drive pulley 22. This allows a balancing of forces. The gearing is aligned such that the tangential tooth load is opposite in direction to the load imposed by the cable. Thus the cable force is balanced. As the planet gear 42 and drive pulley 22 are rigidly connected, torque is transferred from planet gear 42 to drive pulley 22. Thus the torque in the planet gear 42 and drive pulley 22 are equal. The force in the cable 14 is equal to the torque divided by the radius of the pulley 22. Likewise the tangential tooth load is equal to the torque divided by the pitch radius of the planet gear 42. Therefore the radii are of similar size and the forces are balanced.

Figure 4:
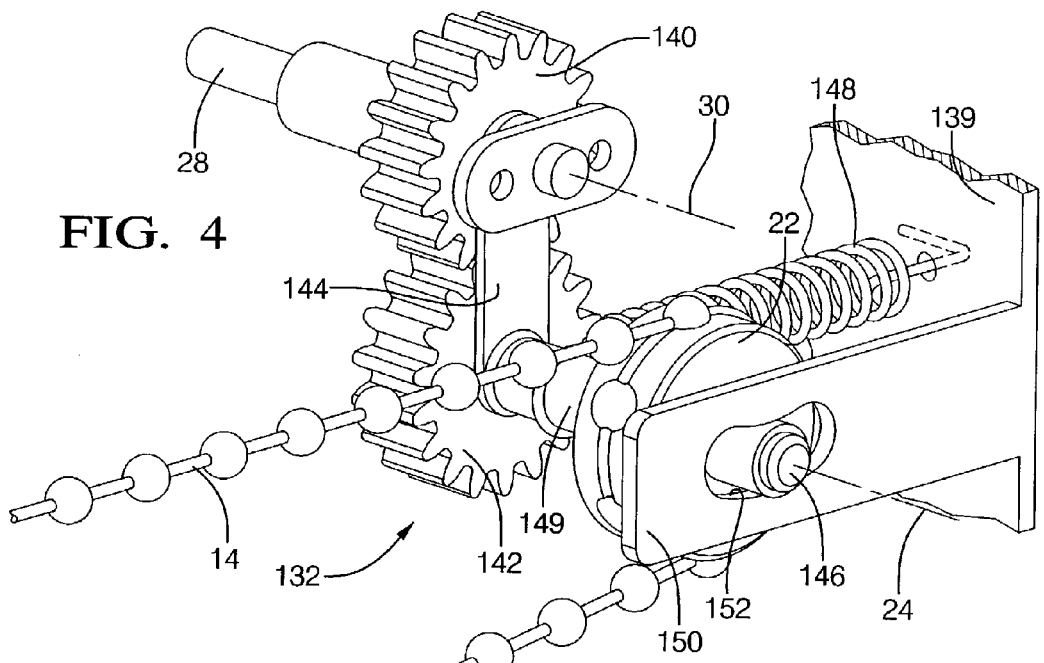
FIG. 4 is a perspective view of an alternate drive assembly in accordance with the invention.

Referring now to FIG. 4, a drive assembly of the invention having an alternate tensioning mechanism 132 is disclosed. Tensioning mechanism 132 comprises a housing 139 for a sun gear 140, a planet gear 142 that meshes with the sun gear 140 and a planet carrier 144 that supports the planet gear 142 rotationally.

Sun gear 140 is rotated about drive axis 30 by drive shaft 28 via an optional torsional damper (not shown) if necessary. Planet carrier 144 is mounted in housing 139 for rotation about drive axis 30. Planet gear 142 is rotationally supported by planet carrier 144 off center so that planet gear 142 has an axis that travels in a circular orbit about drive axis 30 when planet carrier 144 is rotated.

Planet gear 142 is connected to drive pulley 22 by planet shaft 146 and thus moveable pulley axis 24 travels in the same circular orbit about drive axis 30 as the axis of planet gear 142 when planet carrier 144 is rotated. Tensioning mechanism 132 also includes a tension spring, shown schematically at 148 that rotates planet carrier 144 counterclockwise about drive axis 30 as shown in FIG. 4. Planet carrier 144 is rotated incrementally to the locate pulley axis 24 in the circular orbit and thus adjust the location of the pulley axis 24 with respect to drive axis 30 so as to take up slack in cable 14. More particularly, tension spring 148 is connected to an tubular arm 149 of planet carrier 144 at one end and to a fixed anchor of housing 139 at the opposite end. Tension spring 148 produces a counterclockwise moment force on planet carrier 144 that tends to move pulley axis 24 toward the right as viewed in FIG. 4. This movement is resisted by cable 14 that is wrapped around the right side of pulley 22. Hence, the location of the pulley axis 24 is automatically adjusted when the tension in cable 24 produces a clockwise moment force on planet carrier 144 that cancels the counterclockwise moment force produced by tension spring 148.

Tensioning mechanism 132 further includes means to limit the travel of pulley axis 24 in the circular orbit about the drive axis 30 comprising an arcuate slot 152 in a side wall 150 of housing 139 and a roller that is journalled on planet shaft 146 and disposed in the arcuate slot 152.

Planet gear 142 preferably has a similar pitch diameter as the drive pulley 22. This allows a balancing of forces as explained above.

Tensioning mechanisms 32 and 132 adjust the position of the pulley axis 24 in a circular or arcuate path using a planetary gear, such as planet gear 42 or 142.

Figure 5:
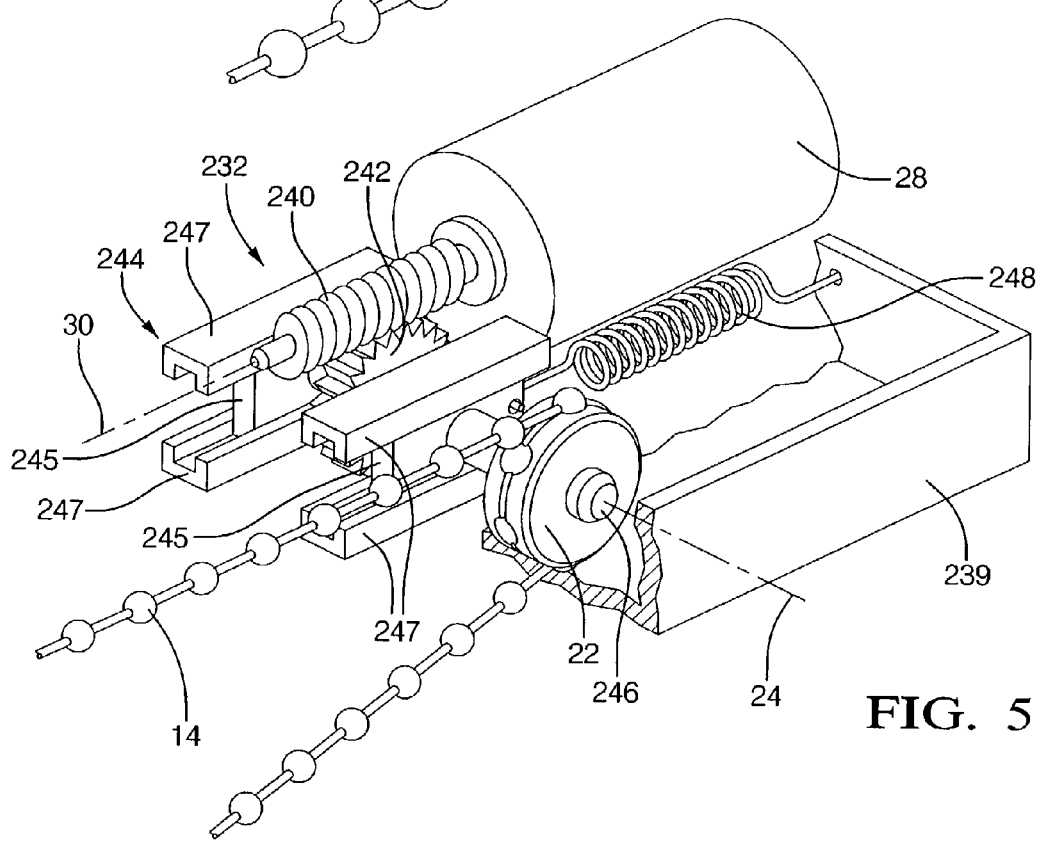
FIG. 5 is a perspective view of another alternate drive assembly in accordance with the invention.

Referring now to FIG. 5, a drive assembly of the invention having another alternate tensioning mechanism 232 that adjusts the position of the pulley axis 24 in a linear path. Tensioning mechanism 232 comprises a housing 239 for a worm gear 240 of extended length, a helical gear 242 that meshes with the worm gear 240 and a carrier 244 that supports the helical gear 242 rotationally.

Worm gear 240 is rotated about drive axis 30 by motor shaft 28 directly thus eliminating the need for a speed reducing gear between the electric motor 34 and the tensioning mechanism 232. Carrier 244, which comprises slide blocks 245 disposed in parallel slides 247 equidistantly spaced on either side of helical gear 242, is mounted in housing 239 for translation parallel to drive axis 30. Helical gear 242 is rotationally supported by carrier 244 so that helical gear 242 has an axis that is transverse to drive axis 30 and travels in its transverse orientation in an imagary plane or path that is parallel to drive axis 30 when carrier 244 is translated.

Helical gear 242 is connected to drive pulley 22 by gear shaft 246 that is journalled in slide blocks 245. Thus moveable pulley axis 24 is also transverse to drive axis 30 and travels in the imaginary plane or path that is parallel to drive axis 30 when carrier 244 is translated. Tensioning mechanism 232 also includes tension springs 248 (one shown) that translate slide blocks 245, gear shaft 246, helical gear 242 and drive pulley 22 toward the right as view in FIG. 5 to locate pulley axis 24 along the path that is parallel to drive axis 30. Pulley axis 24 is translated incrementally to locate pulley axis 24 in the path and thus adjust the location of the pulley axis 24 with respect to drive axis 30 so as to take up slack in cable 14. More particularly, tension springs 248 are connected to respective slide blocks 245 at one end and to fixed anchors of housing 239 at their respective opposite ends. Tension springs 248 are preferably aligned with axis 24 to produce a linear force on drive pulley 22 that tends to move pulley axis 24 toward the right as viewed in FIG. 5. This movement is resisted by cable 14 that is wrapped around the right side of pulley 22. Hence, the location of the pulley axis 24 is automatically adjusted when the tension in cable 14 produces a countert force on drive pulley 22 that cancels the linear force produced by tension springs 248.

Worm gear is preferably aligned so that drive axis 30 is approximately parallel to the main length of cable 14 while helical gear 242 preferably has a similar pitch diameter as the drive pulley 22. This allows a balancing of forces between the load on the helical gear 242 and the cable 14 as explained above.

While the preferred embodiment has been described in connection with a particular flexible drive member, beaded cable 14, and a particular rotary drive member, drive pulley 22, it should be understood that the drive assembly of the invention can be adapted for any flexible drive member in conjunction with any rotary drive member that can drive the flexible drive member in a closed loop. In other words, the above description is intended to illustrate a preferred embodiment of the invention rather than to limit the invention. Therefore, descriptive rather than limiting words are used. Obviously, it is possible to modify this invention from what the description teaches. Within the scope of the claims, one may practice the invention other than as described.

What is claimed is:

1. A drive assembly for a closed loop cable system in which a cable drives a moveable structure back and forth and in which the cable is wrapped around and driven by a drive pulley, the drive assembly comprising:
    the drive pulley,
    a motor unit having a motor shaft that rotates around a drive axis for rotating the drive pulley around a drive pulley axis, and
    a tensioning mechanism that adjusts the position of the drive pulley axis with respect to the drive axis responsive to tension in the cable.

2. The cable drive assembly as defined in claim 1 wherein the pulley axis moves in a circular orbit about the drive axis and the tensioning mechanism adjusts the position of the drive pulley axis with respect to the drive axis in the circular orbit.

3. The cable drive system as defined in claim 1 wherein the pulley axis is transverse to the drive axis and moves in a path parallel to the drive axis and wherein the tensioning mechanism adjusts the position of the pulley axis with respect to the drive axis in the path parallel to the drive axis.

4. The drive assembly as defined in claim 1 wherein the flexible drive member is a cable.

5. The drive assembly as defined in claim 1 wherein the flexible drive member is a beaded cable.

6. A drive assembly for a closed loop system in which a cable drives a moveable structure back and forth and in which the cable is wrapped around and driven by a drive pulley the drive assembly comprising:
    a motor unit having an output shaft rotatable about a drive axis for rotating the drive pulley about a pulley axis, and
    a tensioning mechanism for adjusting the position of the pulley axis of the drive pulley with respect to the drive axis of the output shaft of the motor responsive to tension in the cable,
    the tensioning mechanism including a first gear driven by the motor about the drive axis, and a second gear meshing with the first gear and driven about the pulley axis of the drive pulley.

7. The drive assembly as defined in claim 6 wherein the tensioning mechanism includes a moveable carrier that is spring biased in one direction, and wherein the second gear is mounted on the carrier rotationally.

8. The drive assembly as defined in claim 7 wherein the moveable carrier is spring biased in one direction by a tension spring.

9. The drive assembly as defined in claim 8 wherein the tension spring has one end attached to the carrier and an opposite end attached to a fixed reaction member.

10. The cable drive assembly as defined in claim 6 wherein the pulley axis moves in a circular orbit about the drive axis and the tensioning mechanism adjusts the position of the pulley axis with respect to the drive axis in the circular orbit.

11. The cable drive system as defined in claim 6 wherein the pulley axis is transverse to the drive axis and moves in a path parallel to the drive axis and wherein the tensioning mechanism adjusts the position of the pulley axis with respect to the drive axis in the path parallel to the drive axis.

12. A cable drive assembly for a closed loop system in which a cable drives a moveable structure back and forth and in which the cable is wrapped around a drive pulley and an idler pulley that is spaced from the drive pulley, the cable drive system comprising:
    the drive pulley being rotatable about a pulley axis,
    a motor unit having an output shaft rotatable about a drive axis for rotating the drive pulley about the pulley axis, and
    a tensioning mechanism for adjusting the position of the pulley axis of the drive pulley with respect to the drive axis of the output shaft of the motor unit,
    the tensioning mechanism including a first gear driven by the motor unit about the drive axis, and a second gear meshing with the first gear and driven about the pulley axis of the drive pulley by the first gear.

13. The cable drive assembly as defined in claim 12 wherein the tensioning mechanism further includes a carrier that is rotatable concentrically with respect to the first gear, the second gear being journalled in the carrier in an offset location so that the pulley axis moves in a circular orbit with respect to the drive axis when the rotor is rotated with respect to the first gear, and spring means to rotate the rotor with respect to the first gear in one direction.

14. The cable drive assembly as defined in claim 12 wherein the tensioning mechanism includes a worm gear driven by the motor unit about the drive axis, and a helical gear meshing with the worm gear and driven about the pulley axis of the drive pulley by the worm gear.

15. The cable drive assembly as defined in claim 14 wherein the tensioning mechanism further includes a carrier that is moveable in a direction that is parallel to the axis of the worm gear, the helical gear being journalled in the carrier so that the pulley axis is transverse to the drive axis and moves in a path that is parallel to the drive axis and wherein the tensioning mechanism includes spring means to move the carrier with respect to the worm gear in one direction.

16. The cable drive assembly as defined in claim 12 wherein the pulley axis moves in a circular orbit about the drive axis and the tensioning mechanism adjusts the position of the pulley axis with respect to the drive axis in the circular orbit.

17. The cable drive system as defined in claim 12 wherein the pulley axis is transverse to the drive axis and moves in a path parallel to the drive axis and wherein the tensioning mechanism adjusts the position of the pulley axis with respect to the drive axis in the path parallel to the drive axis.

18. A drive assembly for a closed loop cable system in which a cable is wrapped around and driven by a drive pulley, the drive assembly comprising:
   the drive pulley,
   a motor unit having a motor shaft that rotates about a drive axis for rotating the drive pulley about a drive pulley axis, and
   a tensioning mechanism for adjusting the position of the drive pulley axis with respect to the drive axis responsive to tension in the cable,
   the tensioning mechanism including a first gear driven by the motor about the drive axis, and a second gear meshing with the first gear and driven about the drive pulley axis of the drive pulley.

* * * * *